United States Patent
Monti

(10) Patent No.: US 6,929,115 B2
(45) Date of Patent: Aug. 16, 2005

(54) SYSTEM FOR HEIGHT ADJUSTMENT OF A STATION FOR FEEDING ITEMS IN A PARTICULAR MACHINE

(75) Inventor: Giuseppe Monti, Pianoro (IT)

(73) Assignee: Marchesini Group, Pian di Macina-Pianoro (IT)

(*) Notice: Subject to any disclaimer, the term of this patent is extended or adjusted under 35 U.S.C. 154(b) by 0 days.

(21) Appl. No.: 10/738,195

(22) Filed: Dec. 17, 2003

(65) Prior Publication Data

US 2004/0123560 A1 Jul. 1, 2004

(30) Foreign Application Priority Data

Dec. 19, 2002 (IT) .................................. BO2002A0804

(51) Int. Cl.⁷ .............................................. B65G 21/00
(52) U.S. Cl. .................................... 198/861.1; 198/435
(58) Field of Search .......................... 198/860.1, 861.1, 198/550.2, 435

(56) References Cited

U.S. PATENT DOCUMENTS

| | | | | |
|---|---|---|---|---|
| 2,799,381 A | * | 7/1957 | Beckley ...................... | 198/435 |
| 3,403,799 A | * | 10/1968 | Sindzinski et al. ......... | 198/435 |
| 4,194,633 A | * | 3/1980 | Paterson et al. ......... | 198/861.1 |
| 4,559,760 A | | 12/1985 | Daniels et al. | |
| 4,601,160 A | | 7/1986 | Heisler | |
| 5,931,341 A | | 8/1999 | Bittermann | |
| 6,227,357 B1 | * | 5/2001 | Brown, Sr. .............. | 198/861.1 |

FOREIGN PATENT DOCUMENTS

| | | |
|---|---|---|
| EP | 0 645304 | 3/1995 |
| EP | 1324667 | 9/2003 |
| GB | 2307893 | 6/1997 |
| JP | 2000 001300 | 1/2000 |

* cited by examiner

*Primary Examiner*—James R. Bidwell
(74) *Attorney, Agent, or Firm*—William J. Sapone; Coleman Sudol; Sapone PC

(57) ABSTRACT

In a system for adjusting the height of a station for feeding items in a packaging machine, in which the feeding station has an outlet conveyor for the articles being delivered to other working stations of the packaging machine, the working stations are adjusted in height with respect to a common zero reference plane by a control unit. A lower stationary framework carries the item feeding station, while an upper moving framework is interposed between the feeding station and the lower stationary framework. A driving belt is powered by a motor for moving the moving framework with respect to the stationary framework. The motor is connected to the control unit for receiving an activation command corresponding to a height for the outlet conveyor determined in dependence of the height imposed to the other working stations. The driving belt move the moving framework vertically with respect to the stationary framework to position the outlet conveyor at a selected height with respect to the reference plane.

10 Claims, 1 Drawing Sheet

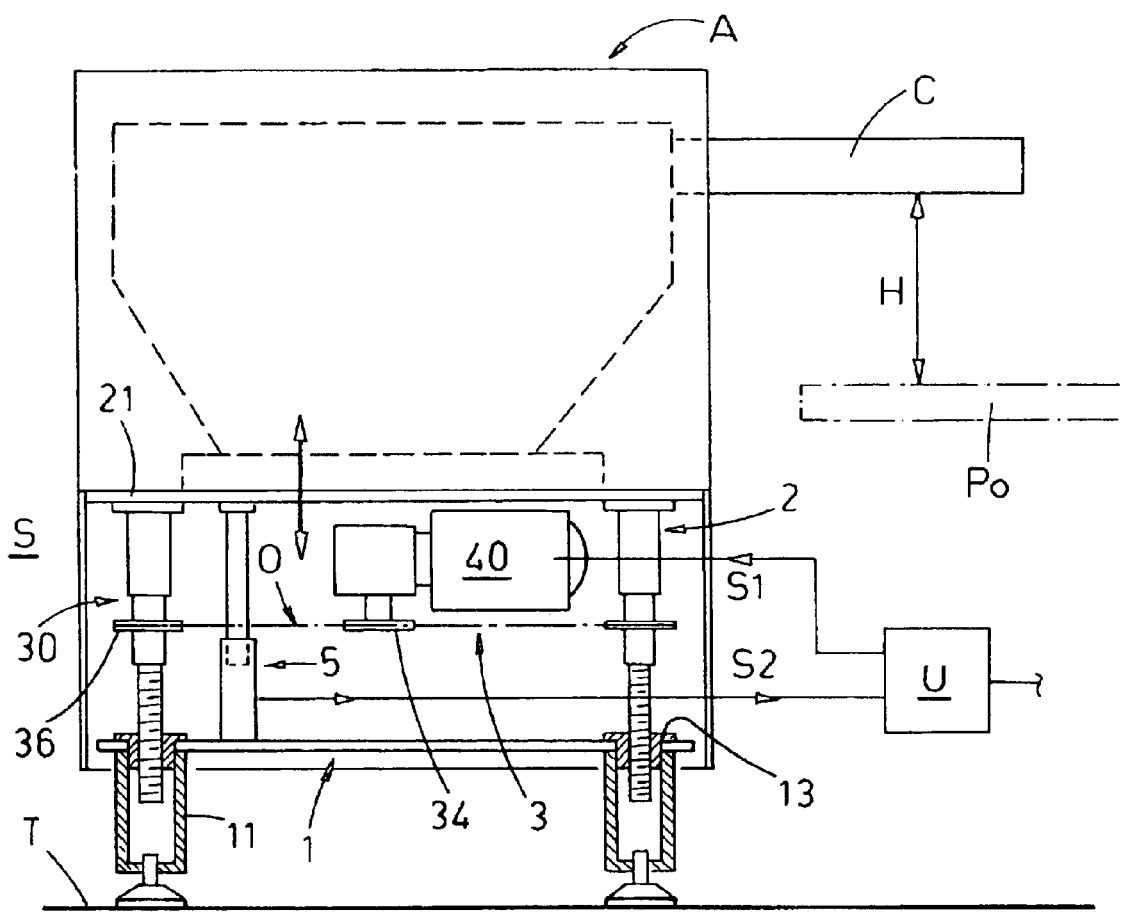
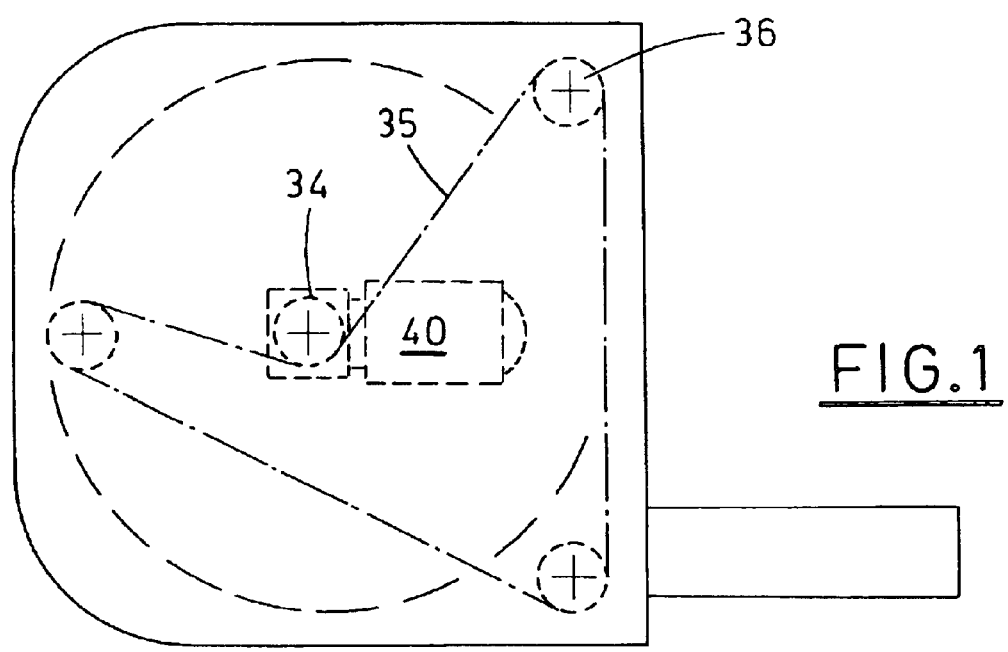
FIG. 2
FIG. 1

SYSTEM FOR HEIGHT ADJUSTMENT OF A STATION FOR FEEDING ITEMS IN A PARTICULAR MACHINE

FIELD OF THE INVENTION

The present invention relates to packaging machines, for example machines which automatically, or semi-automatically, fill receptacles, containers and/or bottles with products, close the filled bottles by applying a cap coming from a cap feeding station and suitable to the product contained in the receptacle, and then prepare a suitable package.

More in detail, the invention relates to a system for height adjustment of a station for feeding items in a packaging machine, for example for the height adjustment of the station for feeding caps to the station of cap application.

DESCRIPTION OF THE PRIOR ART

In known packaging machines, in relation to the size of the containers to be filled and closed, in particular in relation to the containers height with respect to a plane considered as a common zero reference, it is possible to adjust, in automatic and mechanized way, the height of working units of the stations for filling containers and in the station for application of the caps (for example the height of the filling nozzles and of the head applying the caps to the bottles).

However, if the containers size is changed, the height of the caps feeding station with respect to the common reference plane, in particular of the height of the outlet conveyor conveying the caps to the cap application station, is still performed manually by an operator.

SUMMARY OF THE INVENTION

The object of the present invention is to propose a system which allows automatic adjustment, without manual intervention of the operator, the height of the articles feeding station in a packaging machine, without disconnecting the feeding station from the latter.

Another object of the present invention is to propose a system for height adjustment of the cap feeding station in a packaging machine, which interacts with means for adjusting other working stations of the machine with respect to the same common reference plane.

The above mentioned objects are achieved, in accordance with the features of the independent claim, by a system for height adjustment of a station for feeding items in a packaging machine, said feeding station including at least one outlet conveyor for delivering said articles toward other working stations of said packaging machine, said working stations including means for adjusting their height with respect to a common zero reference plane, said adjusting means being controlled by a control unit, said system including:

a lower stationary framework, which carries said station and is fastened to support means;

an upper moving framework for supporting said feeding station; and driving means for shifting said moving framework with respect to said stationary framework, and connected to said control unit, said driving means being capable of receiving from said control unit an activation command related to a desired height value of said outlet conveyor with respect to said reference plane, corresponding to a height imposed by said adjusting means to said other working stations, and consequently displacing said moving framework vertically with respect to said stationary framework to position said outlet conveyor at said height of said other working stations with respect to the reference plane.

BRIEF DESCRIPTION OF THE DRAWINGS

The invention will now be described in more detail with reference to particular, non-limiting embodiments and with reference to the accompanying drawings, in which:

FIG. 1 is a schematic plan view of the system for height adjustment of the article feeding station in a packaging machine, proposed by the present invention;

FIG. 2 is a lateral section view of significant elements of the proposed system.

DESCRIPTION OF THE PREFERRED EMBODIMENTS

With reference to the enclosed figures, the reference letter S indicates a system for the height adjustment of an article feeding station in a packaging machine, proposed by the present invention.

According to the example embodiment shown in the enclosed figures, the feeding station A includes a vibrating bowl, containing caps and equipped with at least one outlet conveyor C for conveying the caps toward subsequent working stations of the packaging machine, for example to a cap application station, toward which also the bottles are conveyed, coming from a filling station.

In known way, the filling station as well as the cap application station of the packaging machine include means for automatic adjustment of the height of the respective working units (for example, of the height of the bottle filling nozzles and of the height of the pick up means, which pick up and apply the caps to the bottles and then tighten the caps onto the bottles, respectively), in relation to the size of the bottles to be packaged.

For this purpose, the packaging machine includes a control unit U, which controls, in relation to the size of the bottles to be packaged, the adjusting means to place the filling nozzles and the cap pick up means at the suitable height with respect to the bottles size.

The height is adjusted by taking as reference the so called zero reference plane for the packaging machine, indicated with $P_0$ in FIG. 2, as the common reference for the machines' various working stations.

The object of the present invention is to propose a system S, which aims at adjusting, automatically and in accordance with the adjustments made in the packaging machine working stations, in relation to the size of the bottles to be packaged, the height of the bowl A containing the caps, in particular the height of the outlet conveyor C with respect to the common zero reference $P_0$.

Consequently, the adjustment system S includes, as shown in FIG. 2, a lower stationary framework 1, which is supported by a surface T, an upper moving framework 2, supporting the bowl A, and driving means, indicated with reference number 3, for shifting the moving framework 2 with respect to the stationary framework 1.

The driving means 3 are connected to the control unit U.

In the shown example, the lower stationary framework 1 is resting on the floor (FIG. 2), otherwise it is possible to fasten the stationary framework 1 to any fixed wall, preferably vertical, for example made in the support structure of the packaging machine connected thereto.

The above mentioned driving means 3 receive from the control unit U an activation command S1 corresponding to a height value H selected for the outlet conveyor C with respect to the zero reference plane $P_0$ in relation to the selected height, by the adjustment means, for the working units of other stations of the packaging machine, in relation to the size of the bottles to be packaged.

Thus, the driving means are aimed at shifting the moving framework 2 vertically with respect to the stationary framework 1 until the outlet conveyor C is positioned at the selected height H with respect to the plane $P_0$.

According to the particular embodiment shown as example in the proposed figure, the lower stationary framework 1 includes a series of feet 11, hollow inside, supported by the surface T, while the upper moving framework 2 includes a plate 21, supporting the bowl A and the means 30 for vertical movement with respect to the stationary framework 1 activated by said driving means 3.

More in detail, the means for vertical movement 30 include a plurality of vertical rods, whose number, for example, corresponds to the number of feet 11 of the stationary framework 1.

The rods are connected at their top to the plate 21 of the moving framework 2, by rotating coupling means of the known type.

The lower plate of the vertical rods feature threading sections, which engage with internal screws 13 fastened to the upper part of the hollow feet 11.

The driving means 3 include an actuator, for example a motor-gearbox 40, whose lower part is connected to the plate 21, and which drives a pulley 34 into rotation on a vertical axis.

The pulley 34 moves a belt 35, which winds on the pulleys 36 keyed directly onto the vertical rods.

Consequently, the pulley 34 drives into rotation the vertical rods pulleys in one direction or another, in relation to the activation command S1, which can raise or lower the height of the outlet conveyor C.

The pulleys make the vertical rods rotate in such a way that the threading sections, engaging with the internal screws 13, move vertically with respect to the stationary framework 1, shifting at the same time the plate 21 of the moving framework 2 and consequently, the outlet conveyor C.

As shown in FIG. 2, the driving pulley 34, as well as the pulleys 36 keyed onto the vertical rods and the relative belt 35, are contained in the same horizontal plane O, moving vertically in accordance to the plate 21 of the moving framework 2.

The system S includes also detecting and feedback means 5, connected to the control unit U, which detect the vertical shift of the moving framework 2 with respect to the stationary framework 1, indicating the real height reached by the outlet conveyor C with respect to the reference plane $P_0$.

The means 5 emit and send to the control unit U a signal S2 corresponding to the value of the real height reached by the moving plate 21, and consequently by the outlet conveyor C. Accordingly, the control unit U deactivates the motor gearbox 40 when the desired height value H is reached.

The detection and feedback means 5 include sensor means for detecting the extension of the vertical shift of the plate 21 of the moving framework 2 with respect to the stationary framework 1, linear transducer means for transforming the value of the shift thus detected into the signal S2, indicating the actual height reached by the outlet conveyor C, and transmission means for transmitting the signal S2 to the control unit U.

According to other possible embodiments, not shown in the enclosed figures, but to be intended as included within the protective scope of the present invention, the means 30 for moving vertically the moving framework 2 with respect to the stationary framework 1 can include a plurality of telescopic rods, or jacks, operated by power means 3 controlled by the control unit U.

It is obvious from the above description how the proposed system S allows, in an extremely rapid and efficient way, automatic adjustment, that is, without requiring manual operations, of the height of the articles feeding station A in a packaging machine with respect to the machine zero reference plane $P_0$.

Moreover, the system S proposed by the invention allows automatic adjustment of the height of the outlet conveyor C for the articles coming out from the feeding station A with respect to the zero reference plane $P_0$, in accordance with the adjustments of the heights of the working units performed in other stations of the same machine, in relation to the size of the articles to be packaged.

Another, particularly advantageous technical-functional aspect of the invention results from the fact that the proposed system S for adjusting the height of the feeding station A, can check, during the height adjustment, the actual height value reached by the outlet conveyor C, comparing it with the desired height value imposed by the size of the articles the machine must package.

What is claimed is:

1. A system for height adjustment of a feeding station for feeding articles in a packaging machine, said feeding station including at least one outlet conveyor for delivering said articles toward at least one working station of said packaging machine, said at least one working station including means for adjusting a height of the at least one working station with respect to a common zero reference plane, said adjusting means being controlled by a control unit, said system comprising:

a lower stationary framework, which carries said feeding station, fastened to support means;

an upper moving framework for supporting said feeding station; and driving means for shifting said moving framework with respect to said stationary framework, said driving means being connected to said control unit, said driving means receiving from said control unit an activation command related to a desired height value of said outlet conveyor with respect to said reference plane, corresponding to a height imposed by said adjusting means of said at least one working station, said driving means displacing said moving framework vertically with respect to said stationary framework to position said outlet conveyor at said height of said at least one working station with respect to the reference plane.

2. The system according to claim 1, further comprising detecting and feedback means, connected to said control unit for detecting a vertical shift of said moving framework with respect to said stationary framework, indicating the actual height reached by said outlet conveyor with respect to the reference plane, and for sending the control unit a signal corresponding to a value of an actual reached height, so that said control unit deactivates said driving means when a desired height value is reached.

3. The system according to claim 1, wherein said stationary framework includes a plurality of hollow supporting feet situated on a horizontal surface, said moving framework having a plate supporting said feeding station and means for vertical movement with respect to said stationary framework which engage internally said supporting feet, said driving means including actuator means for controlling said vertical movement means.

4. The system according to claim 3, wherein said vertical movement means include vertical rods, having an upper part connected, by rotating coupling means, to said plate, and having a lower part equipped with a threading section engaging with corresponding internal screws rigidly fastened to said upper part of the hollow feet, said actuator means including a motor-gearbox, having a motor-gearbox lower part connected to said plate, said motor-gearbox making a driving pulley rotate on a vertical axis, so that said driving pulley moves a belt, wound on corresponding pulleys keyed directly onto said vertical rods.

5. The system according to claim 4, wherein said driving pulley, said corresponding pulleys keyed onto said vertical rods, and said driving belt are located on a common horizontal plane, moving vertically along with said moving framework.

6. The system according to claim 3, wherein said vertical movement means include telescopic rods, connected to said actuator means.

7. The system according to claim 2, wherein said detecting and feedback means include sensor means for detecting an extension of said vertical shift of the moving framework with respect to said stationary framework, transducer means for transforming the value of said shift in said signal indicating the actual height value reached by said outlet conveyor and means for transmitting said signal to said control unit.

8. The system according to claim 1, wherein said stationary framework is fastened to a fixed wall.

9. The system according to claim 8, wherein said fixed wall is vertical.

10. The system according to claim 8, wherein said wall is a part of the support structure of a packaging machine connected to said feeding station.

* * * * *